July 26, 1927.

E. T. CANNON

BELT CONVEYER ARRANGEMENT

Filed Nov. 10, 1925

1,636,680

2 Sheets-Sheet 1

INVENTOR

Espay Telle Cannon

Albert M. Austin

ATTORNEY

July 26, 1927.

E. T. CANNON

BELT CONVEYER ARRANGEMENT

Filed Nov. 10, 1925

1,636,680

2 Sheets-Sheet 2

INVENTOR

Espey Telle Cannon

BY

Albert M. Austin

ATTORNEY

Patented July 26, 1927.

1,636,680

UNITED STATES PATENT OFFICE.

ESPEY TELLE CANNON, OF SALT LAKE CITY, UTAH, ASSIGNOR TO AMERICAN SMELTING AND REFINING COMPANY, OF NEW YORK, N. Y., A CORPORATION OF NEW JERSEY.

BELT-CONVEYER ARRANGEMENT.

Application filed November 10, 1925. Serial No. 68,075.

The invention relates to a belt conveyer arrangement for transferring loose material such as ore from a bin or spout to a belt conveyer in a novel and efficient manner.

According to the invention a movable hopper is interposed between an overhead storage bin and the traveling belt, the hopper being movable throughout the length of the bin. The belt is supported by the hopper in such a manner that no matter at what point along the belt the weight of the material is transferred to it from the hopper, the belt is always supported close to the point of transference of the material. The hopper furthermore may be provided with means for guiding the belt horizontally to keep the belt centered under the discharge opening in the hopper thereby preventing undue spillage of the material from the belt as the material is dropped from the hopper.

An advantage of the invention is the elimination of the usual close spacing of the belt-supporting rollers, the close spacing being necessary in the past to insure sufficient support to the belt at all points to withstand the stress caused by the transfer of the loose material thereto which may take place at any point along the length of the belt under the storage bin, the point being determined by the position of the hopper.

Another advantage of the construction is the overcoming of the loss of power caused by undue binding of the rollers due to the belt sagging at points where the material is fed thereto.

A further advantage is the saving in cost of installation and upkeep of rollers to a marked degree due to the fact that the belt is supported by the hopper where it passes beneath the hopper, its weight and the force caused by the transference of the loose material from the hopper, not being taken by the belt supporting rollers.

Various other objects and advantages of the invention will be obvious from the following particular description of one form of device embodying the invention or from an inspection of the accompanying drawings; and the invention also consists in certain new and novel features of construction and combinations of parts hereinafter set forth and claimed.

In the accompanying drawings I have shown for purposes of illustration one form of device embodying the invention, in which—

Figure 1:
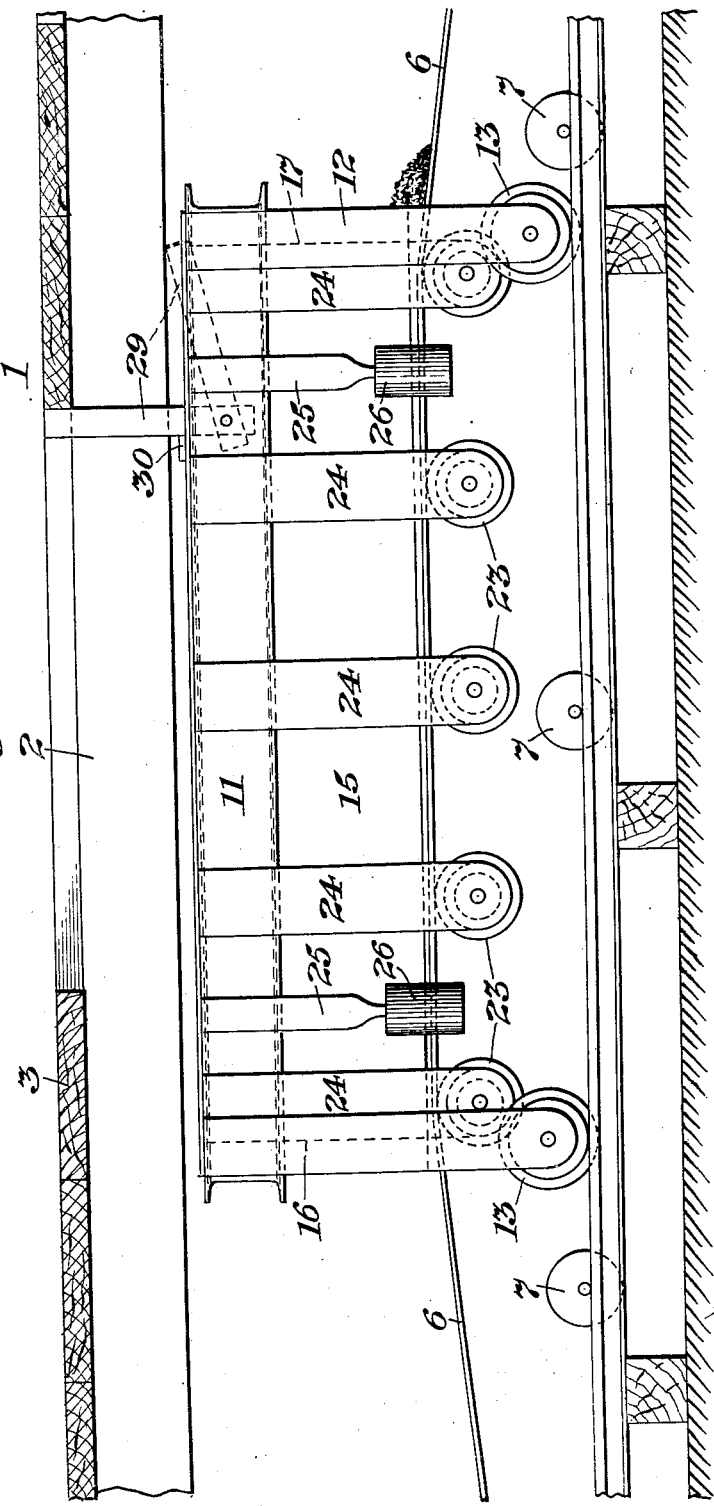
Figure 2:
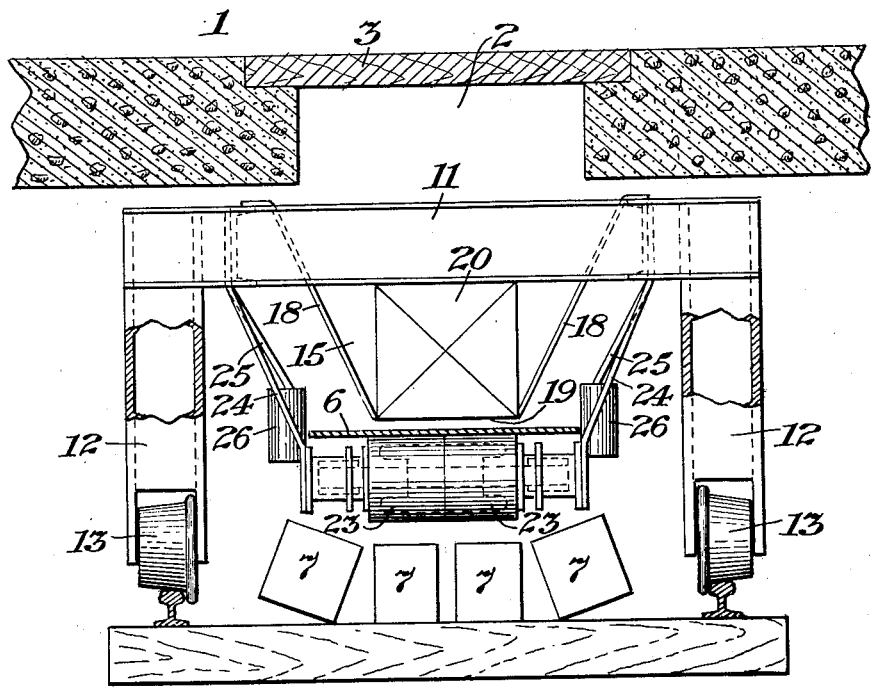

Fig. 1 is a side elevation of a belt conveyer arangement according to the invention, parts being shown in section; and Fig. 2 is an end elevation with parts shown in section.

In the following description and in the claims parts will be identified by specific names for convenience, but they are intended to be as generic in their application to similar parts as the art will permit.

Referring to the drawing, the loose material, such as ore may be stored in an overhead bin 1 which may be of any necessary or desirable construction and which is shown as being made of masonry with a discharge slot 2 in its bottom side. The discharge slot 2 may be closed by means of planks 3, the planks being removed at the point it is desired to dump the ore into the hopper and thence to the traveling belt.

The traveling belt 6 is shown as supported by a plurality of sets of rollers 7, each set causing the belt to assume a curve which is transversely concave upwardly. This shape, it is well understood, helps to keep the ore from spilling over the sides of the belt. The belt may extend for any desired distance and is supported by the sets of rollers 7 except in the vicinity of the traveling hopper 10 for a purpose hereinafter described more in detail.

In order to aid in the transfer of the ore or other loose material from the storage bin 1 to the traveling belt 6, a hopper may be interposed between the bin and the belt to receive the loose material from the bin and to deliver same to the belt. The hopper 10 may be made of a suitable horizontally disposed rectangular frame 11 having supporting columns 12 at the corners thereof, the columns 12 having preferably flanged wheels 13 at their lower ends which are designed to ride on track rails 14 disposed on either side of the belt 6. Depending from the rectangular frame 11 may be an open top container 15 having preferably vertical flat ends 16 and 17 and sloping sides 18 which end in a horizontal flat bottom 19. The front end 17 may have a discharge opening 20 which may be closed by any suitable means as by a sliding door to control the feeding of ore from the hopper to the belt.

In order to reliably and efficiently support the traveling belt at the point where the ore is fed thereto through the discharge opening 20 a plurality of rollers 23 may be provided which are adapted to maintain the belt 6 in close relation to the bottom of the container 15. These rollers 23 may be supported by pairs of supporting brackets 24 depending from a frame 11 at intervals along the length thereof. In order to guide the belt 6 in a horizontal plane a plurality of guiding brackets 25 may be provided depending from the frame 11, each bracket having a guiding roller 26 at the end thereof. A pair of guiding brackets may be placed near each end of the traveling hopper.

Pivoted to the frame may be a stop bar 29. This stop bar may swing from an inoperative position as shown by the dotted lines on the drawing to an operative position which is shown by the full lines. When this bar is in its operative or upper position it may engage the unremoved planks 3 in the bottom of the storage bin 1 to prevent motion of the hopper 10 until that plank is removed. An abutment member 30 may be secured to the frame 11 to limit the swing of the stop bar 29. The motion of the belt 6 is such as to normally hold the stop bar 29 in contact with the plank, thereby preventing further movement of the hopper till that plank is removed.

When it is desired to transfer the material stored in the bin to the belt, a suitable amount of material is dropped into the hopper by lifting up the proper planks 3. The hopper 10 may be moved along to any part of the bin which it is desired to empty. The material may be dumped into the hopper in any manner and with very little care as no spillage or loss of the ore is possible. When the ore is fed from the hopper 10 on to the belt 6 through the discharge opening 20 there is little possibility of spillage of the ore off the belt because not only has the ore a very small, almost negligible drop, from the hopper to the belt, but the belt is supported very close to the feeding point by the supporting rollers 23 on the bottom of the hopper.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

What I claim is:—

1. In combination, a storage bin, a traveling belt beneath said bin, a plurality of supports for normally supporting said belt, a hopper between said bin and belt having means enabling it to travel parallel to said belt under said bin, and means carried by and underneath said hopper for supporting and guiding said belt free of its supports where said belt passes under said hopper.

2. In combination, a storage bin, a traveling belt conveyer beneath said bin, a plurality of supports for normally supporting said belt, a hopper between said bin and belt having means enabling it to travel parallel to said belt under said bin, said hopper having a discharge opening, and means on said hopper near said discharge opening for supporting and guiding said belt free of its supports where said belt passes under said hopper.

3. In combination, a storage bin, a traveling belt conveyer beneath said bin, a plurality of supports for normally supporting said conveyer, a hopper between said bin and belt and means below said hopper and carried thereby for supporting said belt free of its supports where said belt passes under said hopper.

4. A belt conveyer arrangement comprising an endless belt, a plurality of sets of supporting rollers for supporting said belt, a track having a rail on each side of said belt, a hopper having a rectangular frame with supporting columns at the corners thereof, said columns having wheels at their lower ends travelling on said track, an open top container hung from said frame and having a discharge opening, a plurality of pairs of supporting brackets depending from said frame; a roller between each pair of brackets supporting said belt off the supporting rollers under said hopper, a pair of guide brackets depending from said frame at each end, a roller on each guide bracket engaging the edges of said belt to guide said belt laterally, and an overhead bin having a bottom opening extending longitudinally of said belt, said bin having planks for closing said opening.

5. A belt conveyer arrangement comprising an endless belt, a plurality of sets of supporting rollers, each set being arranged to make said belt define a trough section, a track having a rail on each side of said belt, a hopper having a rectangular frame with supporting columns at the corners thereof, said columns having wheels at their lower ends travelling on said track, an open top container hung from said frame and having downwardly converging side walls and flat bottom and end walls, the front end wall having an opening with an adjustable vertical gate, a plurality of pairs of supporting brackets depending from said frame, a roller between each pair of brackets supporting said belt off the supporting rollers under said hopper, a pair of guide brackets depending from said frame at each end, a roller on each guide bracket engaging the edges of said belt to guide said belt laterally, and an overhead bin having a bottom opening extending longitudinally of said belt, said bin having planks for closing said opening.

6. In combination, a traveling belt, a plurality of spaced sets of rollers normally supporting said belt, a loading hopper over said belt movable parallel to said belt, said hopper having a discharge opening, and means on said hopper for supporting said belt adjoining said opening free of said rollers.

7. A belt conveyer loading hopper comprising a frame having means for enabling the hopper to travel on a track, an open top container hung from said frame and having a discharge opening, a plurality of supporting brackets depending from said frame having means for supporting a traveling belt, and guide brackets depending from said frame at each end having means for guiding said belt laterally.

8. A belt conveyer loading hopper comprising a rectangular frame having supporting columns at the corners thereof, said columns having wheels at their lower ends to enable the hopper to travel on a track, an open top container hung from said frame and having a discharge opening, means for entirely supporting a traveling belt as it passes under said opening including a plurality of supporting brackets depending from said frame and rollers mounted on said brackets, and means for guiding said traveling belt including guide brackets depending from said frame at each end and rollers mounted on said guide brackets.

9. A belt conveyer loading hopper comprising a rectangular frame having supporting columns at the corners thereof, said columns having wheels at their lower ends to enable the hopper to travel on a track, an open top container hung from said frame and having downwardly converging side walls, and flat bottom and end walls, the front end wall having a discharge opening with an adjustable vertical gate, a plurality of pairs of supporting brackets depending from said frame, a roller mounted on each pair of brackets and adapted to support a traveling belt, a pair of guide brackets depending from said frame at each end, a roller on each guide bracket adapted to guide said belt laterally.

In testimony whereof I have hereunto set my hand.

ESPEY TELLE CANNON.